US012009136B2

(12) United States Patent
Inaba

(10) Patent No.: US 12,009,136 B2
(45) Date of Patent: Jun. 11, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 824 days.

(21) Appl. No.: 16/977,219

(22) PCT Filed: Mar. 1, 2019

(86) PCT No.: PCT/JP2019/008073
§ 371 (c)(1),
(2) Date: Sep. 1, 2020

(87) PCT Pub. No.: WO2019/168151
PCT Pub. Date: Sep. 6, 2019

(65) Prior Publication Data

US 2021/0202150 A1 Jul. 1, 2021

(30) Foreign Application Priority Data

Mar. 2, 2018 (JP) ................................ 2018-037481

(51) Int. Cl.
*H01F 27/25* (2006.01)
*H01F 1/12* (2006.01)
(Continued)

(52) U.S. Cl.
CPC ............ *H01F 27/255* (2013.01); *H01F 1/12* (2013.01); *H01F 27/022* (2013.01); *H01F 27/32* (2013.01); *H01F 37/00* (2013.01); *H01F 41/12* (2013.01)

(58) Field of Classification Search
CPC ........ H01F 27/255; H01F 1/12; H01F 27/022; H01F 27/32; H01F 37/00; H01F 41/12;
(Continued)

(56) References Cited

U.S. PATENT DOCUMENTS

2013/0181801 A1* 7/2013 Yoshikawa .......... H01F 27/263 336/180
2014/0247623 A1* 9/2014 Inaba .................. H02M 3/158 336/61

(Continued)

FOREIGN PATENT DOCUMENTS

JP 2006-351920 A 12/2006
JP 2018-018902 A 2/2018

OTHER PUBLICATIONS

International Search Report, Application No. PCT/JP2019/008073, dated May 14, 2019. ISA/Japan Patent Office.

*Primary Examiner* — Shawki S Ismail
*Assistant Examiner* — Kazi S Hossain
(74) *Attorney, Agent, or Firm* — Honigman LLP

(57) ABSTRACT

A reactor includes a coil including a winding portion; a magnetic core including an inner core portion disposed inside the winding portion and an outer core portion disposed outside the winding portion; and a resin mold portion that covers at least a portion of an outer circumferential surface of the outer core portion, wherein the outer core portion includes a resin core portion made of a composite material including a soft magnetic powder and a resin, and a first through-hole extending through the resin core portion; and a first end and a second end of the first through-hole (Continued)

open to a surface of the outer core portion other than a coil-facing surface that faces the coil, and the resin mold portion is inserted inside the first through-hole.

12 Claims, 6 Drawing Sheets

(51) Int. Cl.

| | |
|---|---|
| ***H01F 27/02*** | (2006.01) |
| ***H01F 27/255*** | (2006.01) |
| ***H01F 27/32*** | (2006.01) |
| ***H01F 37/00*** | (2006.01) |
| ***H01F 41/12*** | (2006.01) |

(58) Field of Classification Search

CPC . H01F 1/26; H01F 3/10; H01F 27/263; H01F 27/306

USPC .......................................... 336/233, 221, 220

See application file for complete search history.

(56) References Cited

U.S. PATENT DOCUMENTS

| | | | | |
|---|---|---|---|---|
| 2015/0248963 | A1* | 9/2015 | Inaba | H02M 7/537<br>336/221 |
| 2017/0053733 | A1* | 2/2017 | Misaki | H01F 27/08 |
| 2018/0033536 | A1* | 2/2018 | Nishi | H01F 27/255 |
| 2019/0189339 | A1* | 6/2019 | Yamamoto | H01F 3/14 |
| 2019/0259532 | A1 | 8/2019 | Hirabayashi et al. | |

* cited by examiner

REACTOR

CROSS-REFERENCE TO RELATED APPLICATIONS

This application is the U.S. national stage of PCT/JP2019/008073 filed on Mar. 1, 2019, which claims priority of Japanese Patent Application No. 2018-037481 filed on Mar. 2, 2018, the contents of which are incorporated herein.

TECHNICAL FIELD

The present disclosure relates to a reactor. This application claims priority based on Japanese Patent Application No. 2018-037481 filed on Mar. 2, 2018, the contents of which are incorporated herein by reference.

BACKGROUND

JP 2017-135334A discloses a reactor for use as a component of a converter for a hybrid vehicle, the reactor including a coil that includes a winding portion formed by winding a winding wire and a magnetic core that forms a closed magnetic circuit. The reactor according to JP 2017-135334A includes a resin mold portion that covers the outer circumference of an outer core portion disposed outside the winding portion. The resin mold portion protects the outer core portion and integrates the components of the reactor.

Depending on the material of the outer core portion and the resin mold portion, the adhesive properties between the two may not be sufficient. In a case in which the adhesion between the outer core portion and the resin mold portion is not sufficient, the resin mold portion may break or separate, resulting in the reactor being dismantled. To avoid this, the resin mold portion may be formed thicker. However, this creates a new problem in that the reactor size is increased.

In light of the foregoing, an object of the present disclosure is to provide a reactor that is firmly formed integrally by a resin mold portion in a manner which does not increase the size of the reactor.

SUMMARY

A reactor according to the present disclosure includes: a coil including a winding portion; a magnetic core including an inner core portion disposed inside the winding portion and an outer core portion disposed outside the winding portion; and a resin mold portion that covers at least a portion of an outer circumferential surface of the outer core portion, wherein the outer core portion includes a resin core portion made of a composite material including a soft magnetic powder and a resin, and a first through-hole extending through the resin core portion, and a first end and a second end of the first through-hole open to a surface of the outer core portion other than a coil-facing surface that faces the coil, and the resin mold portion is inserted inside the first through-hole.

Advantageous Effects of Disclosure

According to the reactor of the present disclosure, a reactor can be provided that is firmly formed integrally by a resin mold portion in a manner which does not increase the size of the reactor.

DISCLOSURE

Detailed Description of Preferred Embodiments

Figure 1:
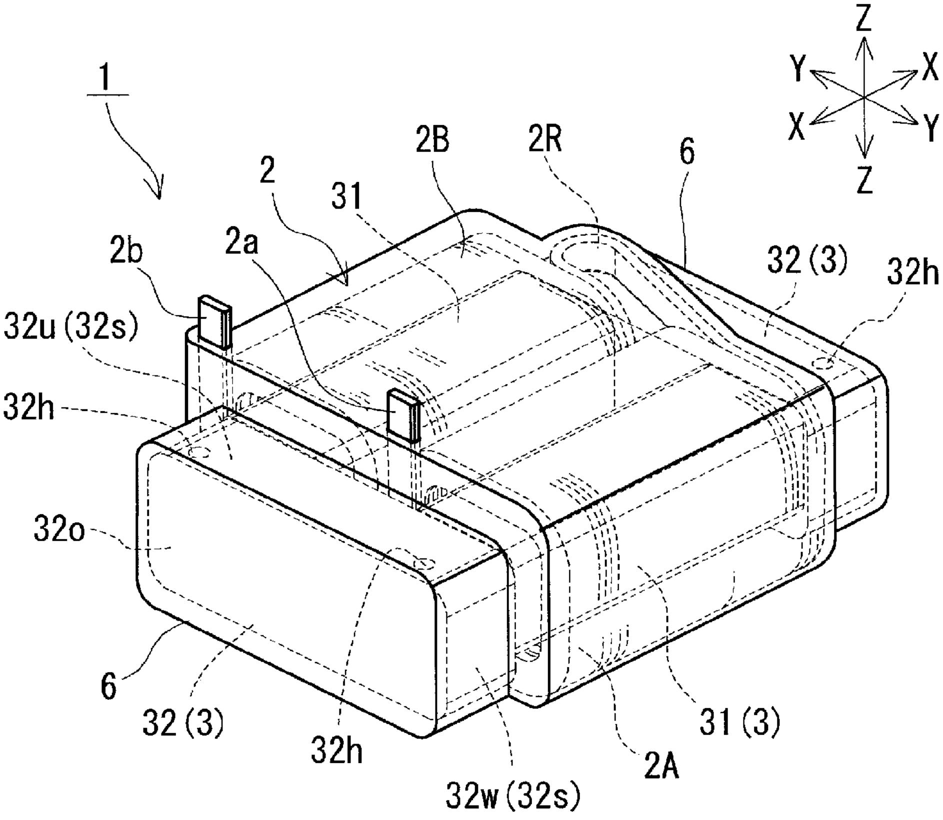
FIG. 1 is a schematic perspective view of a reactor of a first embodiment.

Firstly, embodiments of the present disclosure will be listed and described.

A reactor according to an embodiment includes: a coil including a winding portion; a magnetic core including an inner core portion disposed inside the winding portion and an outer core portion disposed outside the winding portion; and a resin mold portion that covers at least a portion of an outer circumferential surface of the outer core portion, wherein the outer core portion includes a resin core portion made of a composite material including a soft magnetic powder and a resin, and a first through-hole extending through the resin core portion, and a first end and a second end of the first through-hole open to a surface of the outer core portion other than a coil-facing surface that faces the coil, and the resin mold portion is inserted inside the first through-hole.

The outer core portion and the resin mold portion can be firmly joined together by disposing the resin mold portion in the first through-hole that opens to a surface of the outer core portion other than the coil-facing surface and connecting, in an annular manner, the resin mold portion in the first through-hole and the resin mold portion on the outside of the outer core portion from the opening on one side of the first through-hole to the opening on the other side. Thus, there is no need to increase the thickness of the resin mold portion beyond what is necessary, and problems such as the resin mold portion separating from the outer core portion can be suppressed. Accordingly, the reactor can be firmly formed integrally by the resin mold portion in a manner which does not increase the size of the reactor.

The reactor according to an embodiment may have a configuration wherein the first through-hole is a linear hole that opens to an upper surface and a lower surface of the outer core portion at the first end and the second end.

The first through-hole refers to a linear first through-hole that extends in the height direction of the reactor. With a configuration in which the first through-hole extends in the height direction of the reactor, when the resin is molded around the outer circumference of the outer core portion and the resin mold portion is formed, the resin easily enters the first through-hole. Thus, the resin can completely fill the inside of the first through-hole, allowing the reactor to be firmly formed integrally by the resin mold portion. Also, the linear first through-hole can be easily formed, and the filling properties of the resin inside the first through-hole are excellent.

The reactor according to an embodiment may have a configuration further comprising a joining surface where the inner core portion and the outer core portion join together, wherein the inner core portion is made of a composite material including a soft magnetic powder and a resin, and includes a second through-hole that extends in a direction orthogonal to an axial direction of the winding portion through a portion of the inner core portion on the joining surface side; the magnetic core includes a flow path groove for connecting an opening of the first through-hole and an opening of the second through-hole; and the resin mold portion is inserted in the second through-hole via the flow path groove.

The resin mold portion covering the outer core portion enters into the second through-hole of the inner core portion via the flow path groove. Thus, the inner core portion and the outer core portion can be firmly coupled at the joining surface. The second through-hole is aligned orthogonal to the direction of the magnetic flux at the inner core portion, allowing it to function as a gap.

The reactor according to an embodiment may have a configuration wherein the resin mold portion is formed covering an end portion of the winding portion in an axial direction, and not covering an intermediate portion and exposing the intermediate portion to outside.

By the resin mold portion being disposed where the winding portion is disposed, the outer core portion and the winding portion can be joined via the resin mold portion. This allows the reactor to be more firmly formed integrally. In particular, by combining this configuration with the configuration described in "3" above, the outer core portion, the inner core portion, and the winding portion may be all joined together via the resin mold portion. This allows the reactor to be even more firmly formed integrally. Also, the resin mold portion does not cover the intermediate portion of the winding portion. This can enhance heat dissipation from the winding portion by reducing the amount of resin mold portion.

The reactor according to an embodiment may have a configuration wherein the outer core portion includes a powder compact molded body including a soft magnetic powder, and the resin core portion covering an outer circumference of the powder compact molded body.

By the outer core portion including the powder compact molded body which can easily be given high relative permeability, the relative permeability of the outer core portion can be made higher than the relative permeability of the inner core portion. By making the relative permeability of the outer core portion higher than the relative permeability of the inner core portion, magnetic flux leakage between the inner core portion and the outer core portion can be reduced. In particular, increasing the difference in relative permeability between the inner core portion and the outer core portion can more reliably reduce the magnetic flux leakage between the inner core portion and the outer core portion. Using the difference described above, the magnetic flux leakage can be significantly reduced. Also, in the configurations described above, the relative permeability of the inner core portion is low. This allows for the relative permeability of the entire magnetic core to be kept from being too high.

Furthermore, the resin core portion covering the outer circumference of the powder compact molded body allows magnetic flux leakage to the outside of the outer core portion to be suppressed. Thus, energy loss caused by the magnetic flux leakage permeating through the coil can be suppressed.

The reactor according to an embodiment may have a configuration wherein the composite material has a relative permeability of from 5 to 50.

By the composite material having a relative permeability within this range, the overall relative permeability of the magnetic core can be kept from being too high.

The reactor according to the configuration described in 5 above may have a configuration wherein the composite material has a relative permeability of from 5 to 50; and the powder compact molded body has a relative permeability that is from 50 to 500, and that is higher than the relative permeability of the composite material a.

With this configuration, the relative permeability of the outer core portion can be increased and magnetic flux leakage to the outside of the outer core portion can be suppressed.

A reactor according to embodiments of the present disclosure will be described below with reference to the drawings. Components with the same name are given the same reference numeral. Note that the present disclosure is not limited to the configurations described in the embodiments. The present disclosure is defined by the scope of the claims, and all modifications that are equivalent to or within the scope of the claims are included.

First Embodiment

The configuration of a reactor 1 according to a first embodiment is described with reference to FIGS. 1 to 3. The reactor 1 shown in FIG. 1 includes an assembly including a combination of a coil 2 and a magnetic core 3 and a resin mold portion 6 for covering the outer circumference of the assembly. In the reactor 1, a first through-hole 32*h* is formed in an outer core portion 32 that forms a portion of the magnetic core 3. The configuration of components of the reactor 1 will be described in detail below.

Coil

As shown in FIG. 1, the coil 2 of the present embodiment includes a pair of winding portions 2A, 2B and a coupling portion 2R for coupling the winding portions 2A, 2B. The winding portions 2A, 2B are formed in a hollow cylindrical shape and are wounded the same number of times in the same winding direction. The axial directions of the winding portions 2A, 2B are placed side by side with the axial directions parallel with one another. In the present embodiment, the coil 2 is made from one winding wire. However, the coil 2 may also be made by coupling the winding portions 2A, 2B formed from separate winding wires.

Here, the directions of the reactor 1 will be defined with reference to the coil 2. Firstly, the direction along the axial direction of the winding portions 2A, 2B of the coil 2 is defined as the X-direction. The direction orthogonal to the X-direction in which the winding portions 2A, 2B are placed side by side is defined as the Y-direction. The height direction of the reactor 1 orthogonal to both the X-direction and the Y-direction is defined as the Z-direction.

The winding portions 2A, 2B of the present embodiment are formed in a rectangular prism-like shape. The winding portions 2A, 2B with a rectangular prism-like shape are winding portions with a quadrangular (including a square) end surface shape with rounded corners. The winding portions 2A, 2B may of course also be formed in a cylindrical shape. A winding portion with a cylindrical shape is a winding portion with a closed curve (such as an ellipse, a perfect circle, or a stadium) end surface shape.

The coil 2 including the winding portions 2A, 2B may be a coated wire including a conductor, such as a rectangular wire or a round wire, made of an electrically conductive material, such as copper, aluminum, magnesium, or an alloy thereof, and an insulating coating made of an insulating material covering the outer circumference of the conductor. In the present embodiment, the winding portions 2A, 2B are formed by edgewise winding a coated rectangular wire including a conductor made of a copper rectangular wire (winding wire) and an insulating coating of enamel (polyamideimide being a representative example).

End portions 2*a*, 2*b* of the coil 2 extend out from the winding portions 2A, 2B for connection with a terminal member (not shown). The end portions 2*a*, 2*b* have the insulating coating of enamel, for example, removed. The coil 2 connects, via the terminal member, to an external device such as a power supply for supplying electric power to the coil 2.

Magnetic Core

Figure 2:
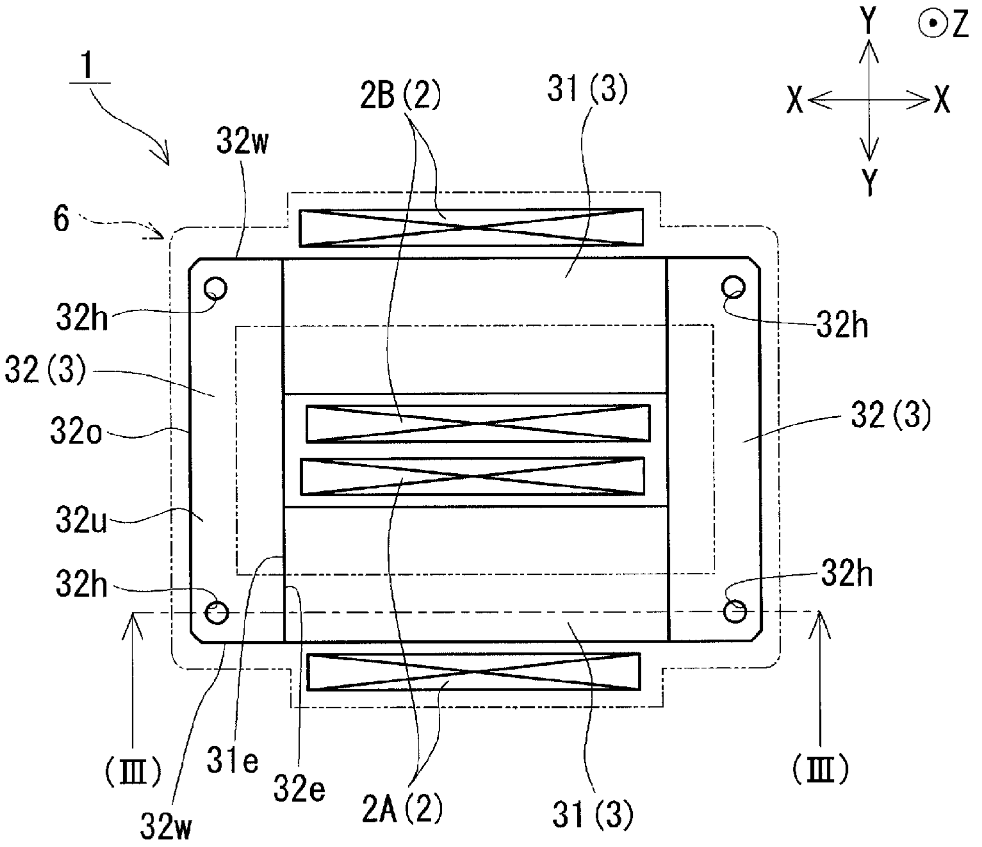
FIG. 2 is a schematic top view of the reactor of FIG. 1.
Figure 3:
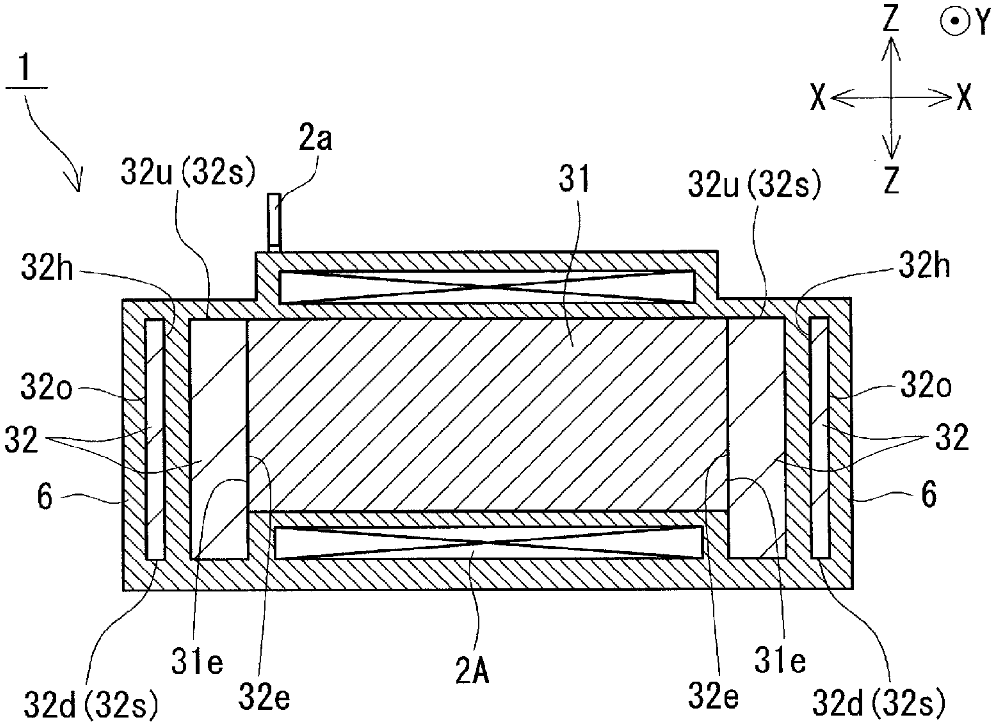
FIG. 3 is a cross-sectional view taken along III-III in FIG. 2.

As shown in FIGS. 1 and 2, the magnetic core 3 includes inner core portions 31 disposed inside the winding portions 2A, 2B and outer core portions 32 that form a closed magnetic circuit with the inner core portions 31. The magnetic core 3 includes a combination of a plurality of divided pieces. In the present embodiment, the magnetic core 3 includes a combination of a pair of divided pieces corresponding to the inner core portions 31 and a pair of divided pieces corresponding to the outer core portions 32.

Inner Core Portion

The inner core portions 31 are portions of the magnetic core 3 that are aligned with the axial direction (X-direction) of the winding portions 2A, 2B of the coil 2. In the present embodiment, as shown in FIG. 2, the end portions of the portions of the magnetic core 3 that are aligned with the axial direction of the winding portions 2A, 2B project out from the end surfaces of the winding portions 2A, 2B (see the position of an end surface 31*e* of the inner core portion 31). The portion that projects out is a portion of the inner core portion 31. The end surface 31*e* of the inner core portion 31 is a joining surface that joins with the outer core portion 32.

The shape of the inner core portion 31 is only required to conform to the internal shape of the winding portion 2A (2B) and is not particularly limited. The inner core portion 31 of the present embodiment has a rectangular parallelepiped-like shape. Also, the inner core portion 31 of the present embodiment is a single body with a non-divided structure. In another embodiment however, the inner core portion 31 may also include a combination of a plurality of divided pieces. The inner core portion 31 may also be a molded body of composite material formed by curing a mixture including soft magnetic powder and uncured resin or may also be a powder compact molded body formed by compression-molding a raw material powder including soft magnetic powder. The inner core portions 31 of the present embodiment is a molded body of a composite material.

Outer Core Portion

The outer core portions 32 shown in FIG. 1 are portions of the magnetic core 3 disposed outside the winding portions 2A, 2B. The shape of the outer core portion 32 is only required to be a shape that can connect to the end portions of the pair of inner core portions 31 and is not particularly limited. The outer core portion 32 of the present embodiment has a rectangular parallelepiped-like shape. The outer core portion 32 includes a coil-facing surface 32*e* (see FIGS. 2 and 3) that faces the end surfaces of the winding portions 2A, 2B of the coil 2, an outer surface 32*o* on the side opposite to the coil-facing surface 32*e*, and a circumferential surface 32*s* that connects the coil-facing surface 32*e* and the outer surface 32*o*. The circumferential surface 32*s* includes an upper surface 32*u* facing vertically upward, a lower surface 32*d* (see FIG. 3) facing vertically downward, and left and right side surfaces 32*w*. As shown in FIGS. 2 and 3, the coil-facing surface 32*e* of the outer core portion 32 and the end surfaces 31*e* of the inner core portions 31 are in contact with one another or substantially in contact with one another with adhesive disposed therebetween.

The outer core portion 32 includes a resin core portion made of a composite material formed by curing a mixture including soft magnetic powder and uncured resin. In the present embodiment, the outer core portion 32 is entirely composed of the resin core portion. As described below in the fifth embodiment, the outer core portion 32 may also include a powder compact molded body in addition to the resin core portion. The configuration of the composite material and the powder compact molded body will be described later.

First Through-Hole

The outer core portion 32 includes first through-holes 32*h*. Each first through-hole 32*h* is a hole that opens to a surface other than the coil-facing surface 32*e* at a first end and a second end. The first through-holes 32*h* of the present embodiment each extend in the height direction (Z-direction) of the reactor 1, with the first end opening to the upper surface 32*u* of the outer core portion 32 and the second end opening to the lower surface 32*d* of the outer core portion 32.

As shown in FIG. 2, the first through-holes 32*h* are preferably disposed outside the annular main magnetic circuit shown by the two-dot chain line. In an embodiment such as the present embodiment in which the outer core portion 32 has a rectangular parallelepiped-like shape, the first through-holes 32*h* are preferably disposed in corner regions away from the coil 2, as seen in a top view of the outer core portion 32. Disposing the first through-holes 32*h* at positions away from the main magnetic circuit allows for the effect of the first through-holes 32*h* on the magnetic properties of the outer core portion 32 to be reduced. Here, the annular main magnetic circuit is the annular circuit connecting the center axes of the inner core portions 31 and the center axes of the outer core portions 32.

The resin mold portion 6 (described below) is inserted inside the first through-hole 32*h*. To form the resin mold portion 6 inside the first through-hole 32*h*, the resin for forming the resin mold portion 6 to be cured may be molded by the outer core portion 32. When molding the resin with the outer core portion 32, the resin enters the first through-hole 32*h* and the resin mold portion 6 is formed inside the first through-hole 32*h*. To improve the filling properties of the resin in the first through-hole 32*h*, the first through-hole 32*h* is preferably a linear hole with a uniform inner circumferential surface in the axial direction. The first through-hole 32*h* is also preferably linear from the perspective of ease of forming.

The shape of the inner circumferential surface of the first through-hole 32*h* orthogonal to the axial direction is not particularly limited and may be an elliptical shape, including a circle, or an irregular shape, including a polygon. From the perspective of the filling properties of the resin in the first through-hole 32*h* and ease of forming the first through-hole 32*h*, the inner circumferential surface of the first through-hole 32*h* is preferably circular. Also, from the perspective of the filling properties of the resin in the first through-hole 32*h* and ease of forming the first through-hole 32*h*, the inner diameter (diameter of a circular hole, maximum width of a hole with an irregular shape) of the first through-hole 32*h* is preferably from 3 mm to 10 mm, and more preferably from 4 mm to 8 mm.

Composite Material

The soft magnetic powder of the composite material for forming the resin core portion of the inner core portion 31 and the outer core portion 32 is an aggregate of soft magnetic particles made of iron group metals such as iron and alloys thereof (for example, Fe—Si alloy and Fe—Ni alloy). An insulating coating containing phosphate, for example, may also be formed on the surface of the soft magnetic particles. Examples of the resin included in the composite material include thermosetting resins, thermoplastic resins, room temperature curable resins, low temperature curable resins, and the like. Examples of thermosetting resins include unsaturated polyester resins, epoxy resins, urethane resins, silicone resins, and the like. Examples of thermoplastic resins include polyphenylene sulfide (PPS) resins, polytetrafluoroethylene (PTFE) resins, liquid crystal polymers (LCP), polyamide (PA) resins such as nylon 6 or nylon 66, polybutylene terephthalate (PBT) resins, acrylonitrile butadiene styrene (ABS) resins, and the like. Alternatively, a bulk molding compound (BMC), a millable silicone rubber, a millable urethane rubber, or the like including calcium carbonate and/or glass fiber mixed with unsaturated polyester may also be used. The composite material described above, in addition to the soft magnetic powder and the resin, may include a non-magnetic, non-metal powder (filler), such as alumina, silica, or the like, to further enhance heat dissipation. The amount of the non-magnetic, non-metal powder may be from 0.2 mass % to 20 mass %, from 0.3 mass % to 15 mass %, or from 0.5 mass % to 10 mass %, for example.

The amount of the soft magnetic powder in the composite material may be from 30 volume % to 80 volume %, for example. From the perspective of enhancing the saturated magnetic flux density and the heat dissipation, the amount of soft magnetic powder may be 50 volume % or greater, 60 volume % or greater, or 70 volume % or greater. From the perspective of enhancing the fluidity in the manufacturing process, the amount of soft magnetic powder is preferably 75 volume % or less.

By giving the molded body of the composite material a low soft magnetic powder filling ratio, the relative permeability can be lowered. For example, the relative permeability of the molded body of the composite material may be from 5 to 50. The relative permeability of the composite material may also be from 10 to 45, 15 to 40, or from 20 to 35.

Powder Compact Molded Body

As described above, a portion of the magnetic core 3 may also include a powder compact molded body. The same materials used in the composite material may be used in the soft magnetic powder included in the raw material powder for forming the powder compact molded body. The raw material powder may also include a lubricant. The powder compact molded body can have a greater amount (for example, greater than 80 volume % or 85 volume % or greater) of soft magnetic powder than the molded body of the composite material, and thus can form a core piece with a higher saturated magnetic flux density and relative permeability. For example, the relative permeability of the powder compact molded body may be from 50 to 500. The relative permeability of the powder compact molded body may also be 80 or higher, 100 or higher, 150 or higher, or 180 or higher.

Resin Mold Portion

The resin mold portion 6 of the present embodiment is disposed covering the entire outer circumferential surface of the assembly of the coil 2 and the magnetic core 3. The resin mold portion 6 integrates the assembly and protects the assembly from the external environment. For the resin mold portion 6, for example, thermosetting resins, such as epoxy resin, phenol resin, silicone resin, urethane resin, and the like; thermoplastic resins, such as PPS resin, PA resin, polyimide resin, fluororesin, and the like; room temperature curable resins, or low temperature curable resins can be used. To enhance heat dissipation, the resin mold portion 6 may also include, with these resins, a ceramic filler, such as alumina or silica.

The resin mold portion 6 is formed by molding uncured resin around the outer circumference of the assembly. The uncured resin enters into the first through-holes **32*h* of the outer core portion 32 when the uncured resin is molded around the outer portion of the outer core portion 32. Each first through-hole 32*h* extends in the height direction of the reactor 1. Thus, the resin easily enters inside the first through-hole 32*h* from the upper end and the lower end of the first through-hole 32*h*. When the resin is cured, the resin mold portion 6 is formed inside the first through-hole 32*h*. As shown in FIG. 3, the resin mold portion 6 in the first through-hole 32*h* and the resin mold portion 6 on the outside of the outer core portion 32 from the opening on one side of the first through-hole 32*h* to the opening on the other side are connected in an annular manner. The resin mold portion 6 that entered the first through-hole 32*h* forms an anchor and the outer core portion 32 and the resin mold portion 6** are firmly joined together.

Also, when the outer portion of the outer core portion 32 is molded using uncured resin, a portion of the uncured resin enters into the gaps between the winding portions 2A, 2B and the inner core portions 31. The cured resin in these gaps has the function of joining together the winding portions 2A, 2B and the inner core portions 31 and the role of ensuring the insulation between the winding portions 2A, 2B and the inner core portions 31.

The resin mold portion 6 is firmly formed integrally with the outer core portion 32 via mechanical engagement with the first through-holes **32*h*. Thus, there is no need to increase the thickness of the resin mold portion 6. For example, the thickness of the resin mold portion 6 at the outer surface 32*o*, the upper surface 32*u*, and the side surfaces 32*w* of the outer core portion 32 may be from 1 mm to 5 mm. A thickness of 1 mm or greater can ensure the strength of the resin mold portion 6. The thickness of the resin mold portion 6** is more preferably from 1.5 mm to 4 mm.

Modes of Use

The reactor 1 of the present embodiment can be used in a constituent member of a power conversion device such as a bidirectional DC-DC converter installed in an electric vehicle, such as a hybrid vehicle, electric vehicle, or a fuel cell vehicle. The reactor 1 of the present embodiment can be used while submerged in a liquid refrigerant. The liquid refrigerant is not particularly limited. However, an automatic transmission fluid (ATF) or the like can be used as the liquid refrigerant in a case in which the reactor 1 is used in a hybrid vehicle. Alternatively, fluorine-based inert liquids such as Fluorinert (trade name); fluorocarbon-based refrigerants, such as HCFC-123 and HFC-134a; alcohol-based refrigerants, such as methanol and alcohol; ketone-based refrigerants such as acetone; and the like can be used as the liquid refrigerant.

Effects

The reactor 1 of the present embodiment is firmly formed integrally with the outer core portion 32 via the resin mold portion 6 being mechanically engaged with the first through-holes **32*h* of the outer core portion 32. Thus, there is no need to increase the thickness of the resin mold portion 6 beyond what is necessary, and cracking and separation of the resin mold portion 6** can be suppressed.

Also, in the present embodiment, the resin mold portion 6 is disposed also at portions where the winding portions 2A, 2B are disposed. Thus, the coil 2 and the magnetic core 3 are firmly formed integrally together via the resin mold portion 6. This allows the coil 2 and the magnetic core 3 to be firmly formed integrally together even in a case in which the gaps between the winding portions 2A, 2B and the inner core portions 31 are small and a portion of the resin mold portion 6 cannot easily enter into these gaps. Having small gaps allows for the size of the reactor 1 to be decreased. For example, the gaps may be from 0.5 mm to 2.0 mm.

Second Embodiment

In the second embodiment, the reactor 1 includes, in addition to the first through-holes 32*h* of the outer core portion 32, second through-holes 31*h* formed in the inner core portion 31. This will be described with reference to FIGS. 4 and 5.

Figure 4:
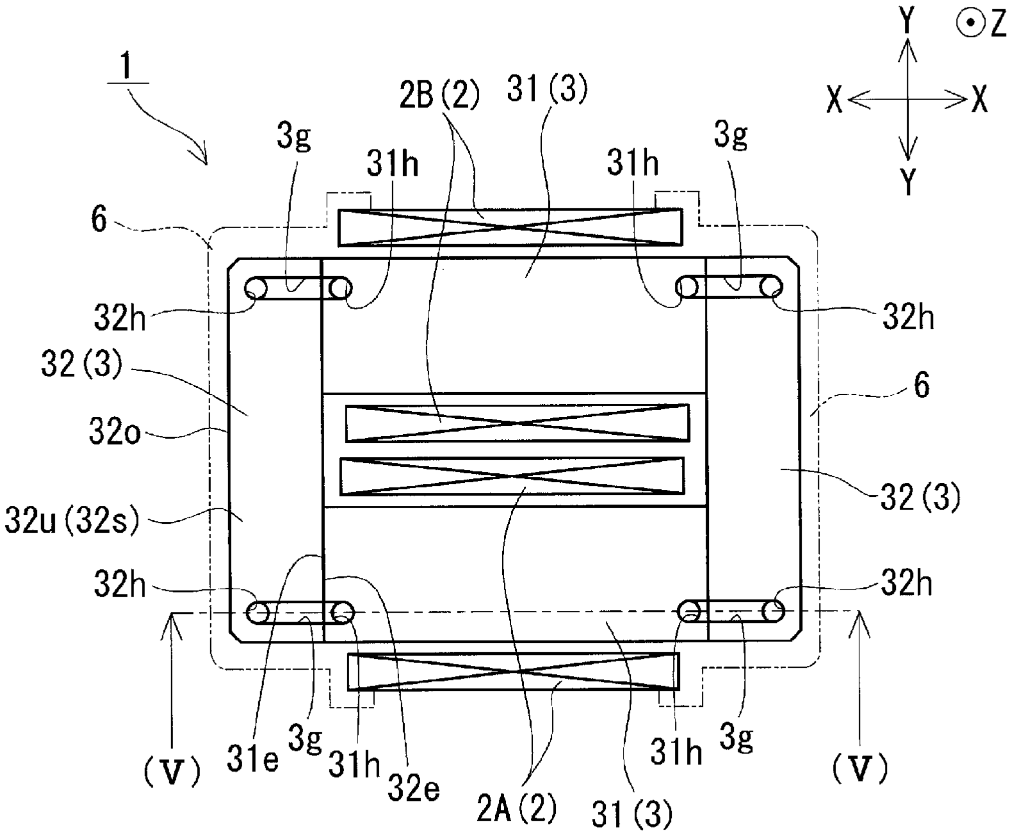
FIG. 4 is a schematic top view of a reactor of a second embodiment.

As shown in a schematic top view of the reactor 1 in FIG. 4, in the present embodiment, the second through-holes 31*h* are formed in portions near the joining surface of the inner core portion 31 that joins with the outer core portion 32 (end surface 31*e*). Each second through-hole 31*h* extends in the height direction (Z-direction) of the reactor 1 orthogonal to the axial direction (X-direction) of the winding portions 2A, 2B. In other words, the second through-hole 31*h* of the inner core portion 31 extends parallel with the first through-hole 32*h* of the outer core portion 32.

The second through-hole 31*h* can be formed in a similar manner to that of the first through-hole 32*h*. For example, the second through-hole 31*h* may be a linear hole with a uniform inner circumferential surface in the axial direction and include a circular inner circumferential surface shape with an inner diameter of from 3 mm to 10 mm.

The positions of the second through-holes 31*h* are not particularly limited. However, each second through-hole 31*h* is preferably disposed outside of the main magnetic circuit of the magnetic core 3. In the present embodiment, the second through-hole 31*h* is disposed on a straight line parallel with the X-direction that passes through the first through-hole 32*h*. This position has low negative impact on the magnetic flux at the inner core portion 31. In another embodiment, the second through-hole 31*h* may be centrally formed in the width direction (Y-direction) of the inner core portion 31. In this case, the second through-hole 31*h* may also function as a gap.

The magnetic core 3 of the reactor 1 of the present embodiment is further provided with a flow path groove 3*g* for connecting the opening of the first through-hole 32*h* and the opening of the second through-hole 31*h*. The flow path groove 3*g* is configured to guide the resin to the second through-hole 31*h* aligned with the winding portions 2A, 2B. Thus, when forming the resin mold portion 6 according to the present embodiment, the resin also enters the second through-hole 31*h* via the flow path groove 3*g*. As a result, the resin mold portion 6 also enters inside the second through-hole 31*h*, allowing the inner core portion 31 and the outer core portion 32 that come into contact at the joining surface to be firmly coupled. In the present embodiment, the second through-hole 31*h* is provided with approximately half of the second through-hole 31*h* overlapping with the winding portions 2A, 2B. However, the second through-hole 31*h* may also be formed with the opening of the second through-hole 31*h* completely overlapping with the winding portions 2A, 2B.

Figure 5:
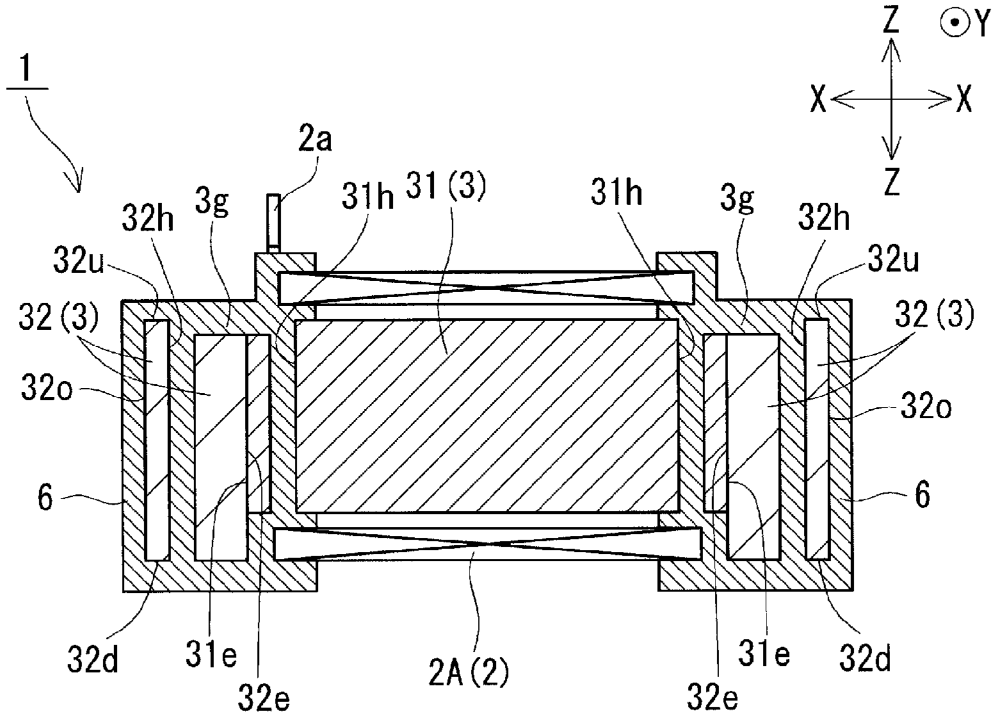
FIG. 5 is a cross-sectional view taken along V-V in FIG. 4.

The resin mold portion 6 of the present embodiment is formed covering the end portions of the winding portions 2A, 2B in the axial direction (for example, 2 or 3 rings from the end portion) and not covering the intermediate portion and exposing the intermediate portion to the outside. In FIG. 5, the gaps between the winding portion 2A, 2B and the inner core portion 31 are shown exaggerated. In reality, the gaps are extremely small, and the resin cannot easily enter into these gaps. Thus, the resin mold portion 6 is disposed only in the gaps near the second through-hole 31*h* and not in the intermediate portion. The shown area in which the resin mold portion 6 is formed is sufficient for the resin mold portion 6 to perform its function of fixing to the outer core portion 32 and protecting the outer core portion 32, and this area is preferable from the perspective of reducing the amount of resin used. With this configuration, in a case in which the reactor 1 is used submerged in a liquid refrigerant, the liquid refrigerant can travel to the inside of the winding portions 2A, 2B from the gaps between the rings of the winding portions 2A, 2B. In this manner, the heat dissipation of the reactor 1 is enhanced.

Third Embodiment

Figure 6:
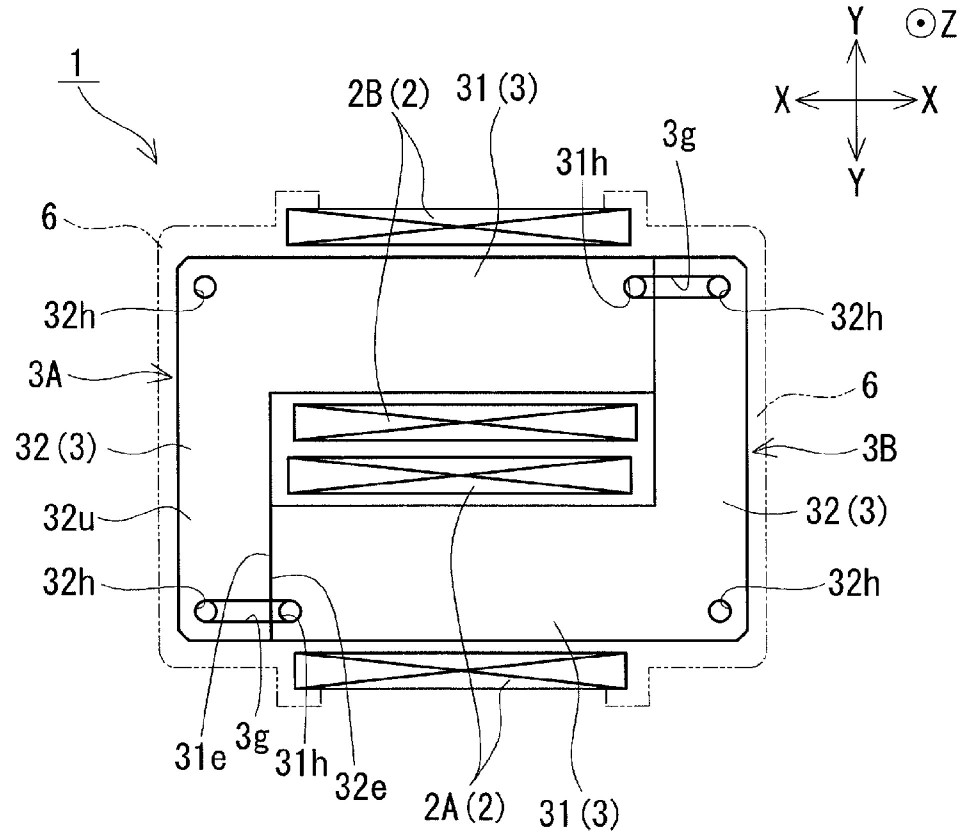
FIG. 6 is a schematic top view of a reactor of a third embodiment.

In the third embodiment, the magnetic core 3 includes a combination of a pair of divided pieces 3A, 3B. This reactor 1 will be described with reference to FIG. 6.

The divided pieces 3A, 3B have the same shape. Thus, only one mold is needed to manufacture the magnetic core 3. This can enhance the productivity of the reactor 1.

The divided pieces 3A, 3B are substantially L-shaped members, each including a single outer core portion 32 and a single inner core portion 31 integrally formed together. As in the second embodiment, the second through-holes 31*h* are formed in the divided piece 3A, 3B at the end side of the inner core portion 31. Also, in the magnetic core 3 including a combination of the divided pieces 3A, 3B, the flow path groove 3*g* is formed for connecting together the first through-hole 32*h* of one divided piece 3A (3B) and the second through-hole 31*h* of the other divided piece 3B (3A).

According to the configuration of the present embodiment, the divided pieces 3A, 3B can be firmly coupled by simply assembling the divided pieces 3A, 3B together and molding the outer core portion 32 using the resin.

Fourth Embodiment

In the fourth embodiment, the axial direction of the first through-hole 32*h* is different from that in the first to third embodiments. This reactor 1 will be described with reference to FIG. 7.

Figure 7:
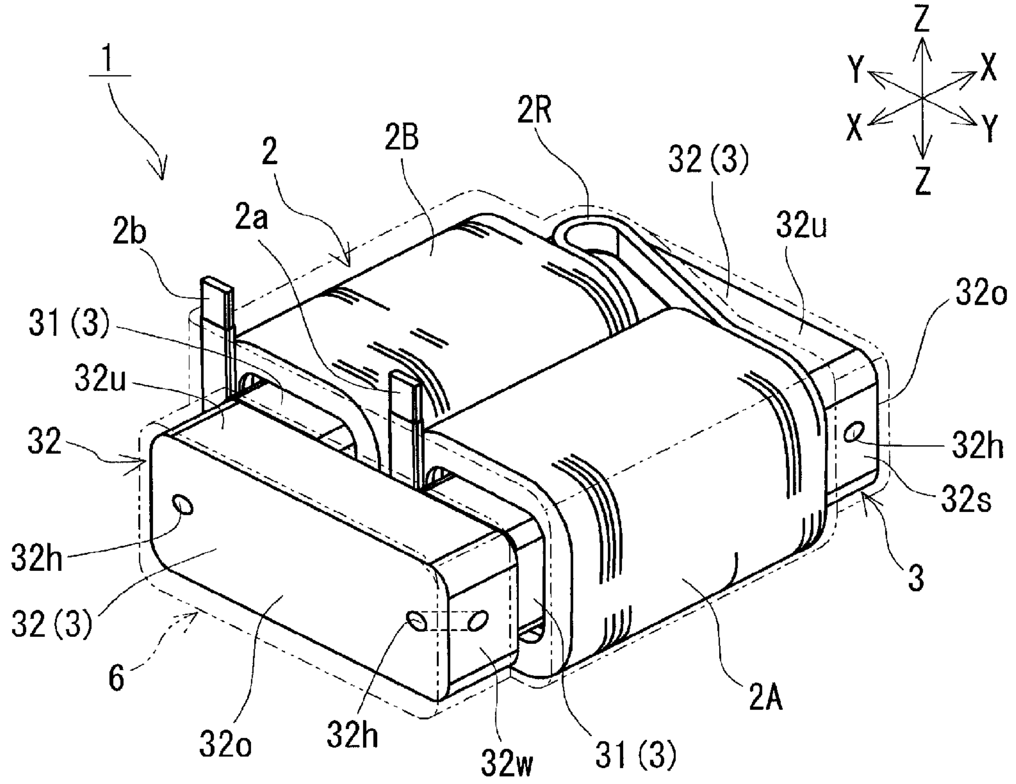
FIG. 7 is a schematic perspective view of a reactor of a fourth embodiment.

As shown in FIG. 7, the first end and the second end of the first through-hole 32*h* of the present embodiment open to the outer surface 32*o* and the side surface 32*w* of the outer core portion 32. With the configuration of the present embodiment, the adhesive properties between the outer core portion 32 and the resin mold portion 6 can be enhanced.

The first through-hole 32*h* of the present embodiment is formed in a corner region of the outer core portion 32 where magnetic flux is low. Thus, the effect of the first through-hole 32*h* on the magnetic properties of the outer core portion 32 is minimal.

Fifth Embodiment

In the fifth embodiment, the outer core portion 32 includes a powder compact molded body. This reactor 1 will be described with reference to FIG. 8.

Figure 8:
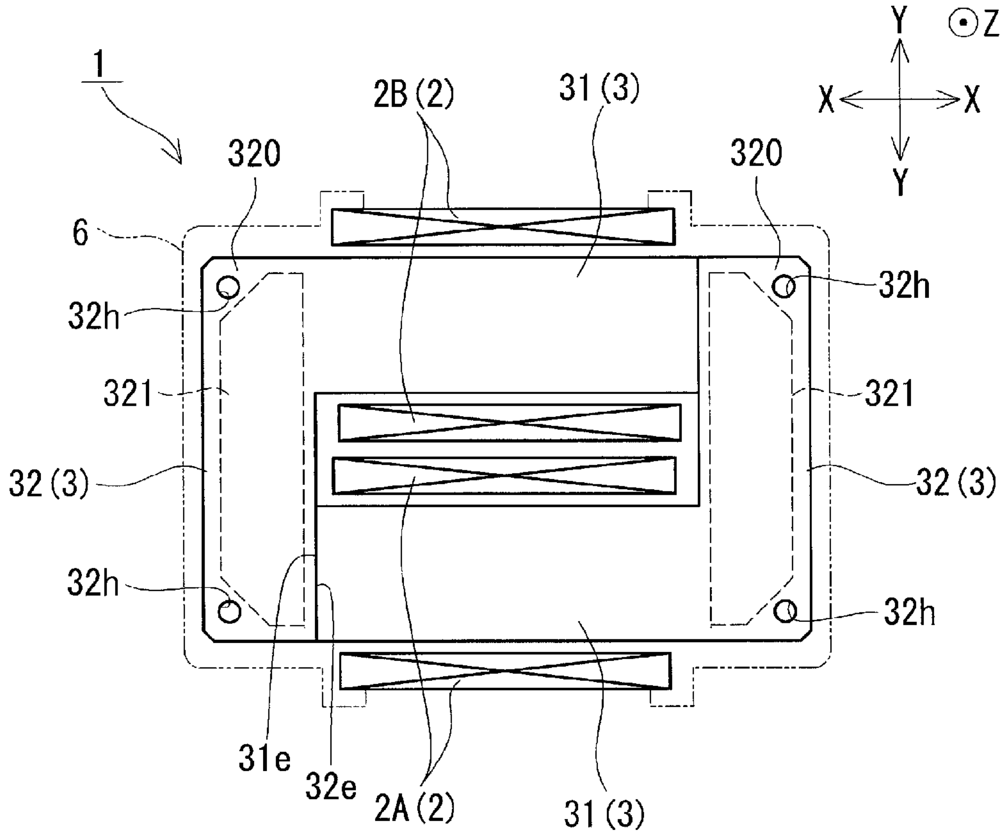
FIG. 8 is a schematic top view of a reactor of a fifth embodiment.

As shown in a schematic top view in FIG. 8, the outer core portion 32 of the reactor 1 of the present embodiment includes a powder compact molded body 321 and a resin core portion 320 covering the outer circumference of the powder compact molded body 321. The first through-hole 32*h* is provided at a position where the resin core portion 320 is formed. The majority of the magnetic field lines pass through the powder compact molded body 321. Thus, reducing the magnetic circuit cross-sectional area of the outer core portion 32 by forming the first through-hole 32*h* in the resin core portion 320 does not cause a substantial problem. Also, by providing the first through-hole 32*h* in the resin core portion 320, the resin core portion 320 and the first through-hole 32*h* can be formed together. This gives the reactor 1 excellent productivity.

By the outer core portion 32 including the powder compact molded body 321 which can easily be given high relative permeability, the relative permeability of the outer core portion 32 can be made higher than the relative permeability of the inner core portion 31. By making the relative permeability of the outer core portion 32 higher than the relative permeability of the inner core portion 31, magnetic flux leakage between the inner core portion 31 and the outer core portion 32 can be reduced. In particular, increasing the difference in relative permeability between the inner core portion 31 and the outer core portion 32 can more reliably reduce the magnetic flux leakage between the inner core portion 31 and the outer core portion 32. Using the difference described above, the magnetic flux leakage can be significantly reduced. Also, in the embodiments described above, the relative permeability of the inner core portion 31 is low. This allows for the relative permeability of the entire magnetic core 3 to be kept from being too high.

Furthermore, the resin core portion 320 covering the outer circumference of the powder compact molded body 321 allows magnetic flux leakage to outside the outer core portion 32 to be suppressed. Thus, energy loss caused by the magnetic flux leakage permeating through the coil 2 can be suppressed.

The invention claimed is:

1. A reactor, comprising:

a coil including a winding portion;

a magnetic core including an inner core portion disposed inside the winding portion and an outer core portion disposed outside the winding portion; and a resin mold portion that covers at least a portion of an outer circumferential surface of the outer core portion, wherein the outer core portion includes:

a resin core portion made of a composite material including a soft magnetic powder and a resin; and a first through-hole having a peripheral side completely bound by the outer core portion and extending through the resin core portion, and a first end and a second end of the first through-hole open to a surface of the outer core portion other than a coil-facing surface that faces the coil, and the resin mold portion is inserted inside the first through-hole so as to be completely bound by the outer core portion; and a joining surface where the inner core portion and the outer core portion join together, wherein the inner core portion is made of a composite material including a soft magnetic powder and a resin, and includes a second through-hole that extends in a direction orthogonal to an axial direction of the winding portion through a portion of the inner core portion on the joining surface side, the magnetic core includes a flow path groove for connecting an opening of the first through-hole and an opening of the second through-hole, and the resin mold portion is inserted in the second through-hole via the flow path groove.

2. The reactor according to claim 1, wherein the first through-hole is a linear hole that opens to an upper surface and a lower surface of the outer core portion at the first end and the second end.

3. The reactor according to claim 1, wherein the resin mold portion is formed covering an end portion of the winding portion in an axial direction, and not covering an intermediate portion and exposing the intermediate portion to outside.

4. The reactor according to claim 1, wherein the outer core portion includes:

a powder compact molded body including a soft magnetic powder; and the resin core portion covering an outer circumference of the powder compact molded body.

5. The reactor according to claim 1, wherein the composite material has a relative permeability of from 5 to 50.

6. The reactor according to claim 4, wherein the composite material has a relative permeability of from 5 to 50, and the powder compact molded body has a relative permeability that is from 50 to 500, and that is higher than the relative permeability of the composite material.

7. The reactor according to claim 2, wherein the resin mold portion is formed covering an end portion of the winding portion in an axial direction, and not covering an intermediate portion and exposing the intermediate portion to outside.

8. The reactor according to claim 2, wherein the outer core portion includes:

a powder compact molded body including a soft magnetic powder; and the resin core portion covering an outer circumference of the powder compact molded body.

9. The reactor according to claim 3, wherein the outer core portion includes:

a powder compact molded body including a soft magnetic powder; and the resin core portion covering an outer circumference of the powder compact molded body.

10. The reactor according to claim 2, wherein the composite material has a relative permeability of from 5 to 50.

11. The reactor according to claim 3, wherein the composite material has a relative permeability of from 5 to 50.

12. The reactor according to claim 4, wherein the composite material has a relative permeability of from 5 to 50.

* * * * *